(12) United States Patent
Choudhury et al.

(10) Patent No.: US 10,169,218 B2
(45) Date of Patent: Jan. 1, 2019

(54) METHOD FOR AUTOMATICALLY VALIDATING DATA AGAINST A PREDEFINED DATA SPECIFICATION

(71) Applicant: ALSTOM Transport Technologies, Saintouen (FR)

(72) Inventors: Abhijeet Choudhury, Karnataka (IN); Mallikarjun Basavarajappa, Karnataka (IN); Anita Menon, Karnataka (IN); Pran Sheokand, Karnataka (IN)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 3 days.

(21) Appl. No.: 15/491,532

(22) Filed: Apr. 19, 2017

(65) Prior Publication Data

US 2017/0315905 A1 Nov. 2, 2017

(30) Foreign Application Priority Data

Apr. 28, 2016 (IN) .............................. 201641014765

(51) Int. Cl.
G06F 11/36 (2006.01)

(52) U.S. Cl.
CPC .......... *G06F 11/3684* (2013.01); *G06F 11/36* (2013.01); *G06F 11/3688* (2013.01)

(58) Field of Classification Search
CPC ............................ G06F 11/36–11/3616; G06F 11/3664–11/3696; G06F 17/2211
USPC .......... 717/124–135; 714/38.1–38.14, 45, 46
See application file for complete search history.

(56) References Cited

U.S. PATENT DOCUMENTS

| | | | |
|---|---|---|---|
| 6,442,714 B1 * | 8/2002 | Griffin ................ | G06F 11/2294 434/350 |
| 7,272,822 B1 | 9/2007 | Riggins et al. | |
| 8,566,794 B2 * | 10/2013 | Rossi .................. | G06F 11/3684 717/125 |
| 9,710,528 B2 * | 7/2017 | Das .................... | G06F 17/30557 |
| 2008/0282231 A1 | 11/2008 | R et al. | |
| 2008/0313616 A1 | 12/2008 | Malcolm | |
| 2012/0096438 A1 * | 4/2012 | Rossi .................. | G06F 11/3684 717/125 |
| 2015/0278393 A1 * | 10/2015 | Das ................... | G06F 17/30557 707/601 |
| 2016/0253155 A1 * | 9/2016 | McNeil ............... | G06F 11/3684 717/108 |

FOREIGN PATENT DOCUMENTS

JP 2001-101036 A 4/2001

* cited by examiner

*Primary Examiner* — Todd Aguilera
(74) *Attorney, Agent, or Firm* — Young & Thompson

(57) ABSTRACT

A method for automatically validating data against a predefined data specification, includes: a) acquiring data to be validated (2), the data including a plurality of test objects, b) acquiring a test database (4) including a plurality of test files each defining a test scenario, c) acquiring a predefined data specification (6) against which the test objects must be validated, d) automatically generating a plurality of test scripts (8), from the acquired test files and using relevant data from the test objects of the acquired predefined data specification, e) for each generated test script, executing the test script (10) on the test objects, and f) automatically generating a test report (12) including a result of each executed test case.

8 Claims, 1 Drawing Sheet

METHOD FOR AUTOMATICALLY VALIDATING DATA AGAINST A PREDEFINED DATA SPECIFICATION

FIELD OF THE INVENTION

The present invention concerns a method for automatically validating data against a predefined data specification. The invention also relates to a data storage medium comprising instructions for implementing said method and an electronic calculator for executing said method.

BACKGROUND OF THE INVENTION

The invention relates specifically to the field of software engineering and development.

Validation methods are known, in which data to be tested, for example data generated automatically as XML files by software development tools, must be compared against a predefined specification, usually in order to detect a malfunction in a software product. Such validation is usually done manually by a dedicated operator. However, this is very time-consuming, especially when data to be tested comprises a large number of parameters.

SUMMARY OF THE INVENTION

The aim of the present invention is therefore to provide a method for automatically validating data against a predefined data specification which is easier and faster to implement, allowing the automatic validation of a large number of data in a short time span.

To that end, the invention relates to a method for automatically validating data against a predefined data specification, comprising steps of:
 a) acquiring data to be validated, said data comprising a plurality of test objects,
 b) acquiring a test database comprising a plurality of test files each defining a test scenario,
 c) acquiring a predefined data specification against which the test objects must be validated,
 d) automatically generating a plurality of test scripts, from the acquired test files and using relevant data from the test objects of the acquired predefined data specification,
 e) for each generated test script, executing said test script on the test objects,
 f) automatically generating a test report comprising a result of each executed test case.

According to advantageous aspects, the invention comprises one or more of the following features, considered alone or according to all possible technical combinations:

The execution of said test script comprises a comparison of data comprised in the test objects with data comprised in the data specification.

The data compared during the execution of said test script comprises at least an attribute of the test objects.

The test scripts are automatically generated by a generation module by adding, to a test scenario defined by a test file, a test parameter depending on the test object.

The test objects are stored in an XML file.

The method comprises the acquisition of user-set formatting options, the test report being generated in a file format according to the acquired formatting options.

According to another aspect, the invention relates to a data recording medium, comprising instructions for implementing a method according to any one of the previous claims when said instructions are executed on an electronic calculator.

According to yet another aspect, the invention relates to an electronic calculator for automatically validating data against a predefined data specification, said electronic calculator being programmed to execute steps of:
 a) acquiring data to be validated, said data comprising a plurality of test objects,
 b) acquiring a test database comprising a plurality of test files each defining a test scenario,
 c) acquiring a predefined data specification against which the test objects must be validated,
 d) automatically generating a plurality of test scripts, from the acquired test files and using relevant data from the test objects of the acquired predefined data specification,
 e) for each generated test script, executing said test script on the test objects,
 f) automatically generating a test report comprising a result of each executed test case.

BRIEF DESCRIPTION OF THE DRAWINGS

The invention will be better understood upon reading the following description, provided solely as an example, and done in reference to the appended drawing, in which.

DETAILED DESCRIPTION OF THE INVENTION

Figure 1:
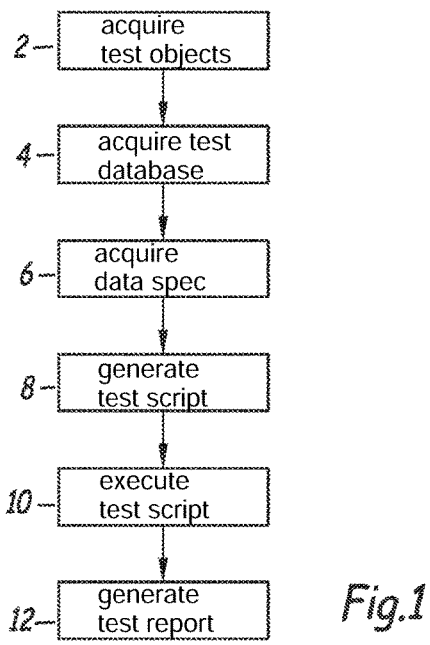
FIG. 1 is a flow-chart illustrating a method for automatically validating data against a predefined data specification according to the invention.

In reference to FIG. 1, a method for automatically testing, or validating, data against a predefined data specification is described.

In this example, the data to be tested is structured using a markup language, such as XML (extensible markup language). The data to be tested is stored in an XML file. As an illustrative example, said data to be tested is data generated automatically as XML files by software development tools during development of a software product. This data must be validated against a predefined specification in order to ensure that the software product is compliant with predefined requirements and does not contain any error.

As is known from the person skilled in the art, XML files include structure elements, such as tags and/or attributes, and data stored as variables of said structure elements, for example stored as values of said tags and/or attributes in the form of numerical values or strings of characters.

The data to be tested, henceforth simply called "test objects". For example, each value of an attribute and/or a tag of the XML file is a single test object.

Said test objects are to be tested against a predefined data specification. If all test objects correspond to the data specification, they are said to be validated. If not, they are said to be erroneous.

This verification is done with the aid of test files, here acquired from a predefined test database comprising a plurality of test files. Each test file defines a test scenario. At this stage, however, test scenarios do not contain the objects to be tested. In this example, test files are .xls files.

The method therefore comprises a step 2 of acquiring said test objects, a step 4 of acquiring the test database comprising a plurality of test files each defining a test scenario, and a step 6 of acquiring the predefined data specification against which the test objects must be validated. Said acquisition steps are executed automatically by an automated module, either sequentially or simultaneously.

Then, in a step 8, said automated module generates automatically a plurality of test scripts, from the acquired test files and using relevant information from the test objects of the acquired predefined data specification.

In an illustrative example, the test object is a physical parameter having multiple data type values. The data specification contains a specified value of this physical parameter. The validation of this test object therefore consists of comparing the specified data type with the specified value. This is the test scenario. To that end, the automated module selects, from the test file, the appropriate comparison function for this test object, here a known conditional structure of the form "if a=b then success else failure". The automated module then generates the test script, using said test file, by writing executable instructions for implementing this conditional structure and in which "a" and "b" are respectively replaced by the specific data values of the test object and the specified value of the data specification. The generated test script is then ready to be executed.

Then, during a step 10, for each test script previously generated during step 8, said test script is executed. In other words the steps 8 and 10 allow executing said test script on the test objects, i.e. on the data objects to be tested.

Finally, during a step 12, a test report is automatically generated by the automated module. Said test report comprising a result of each executed test case. If a test case is a failure, then a result is written in the test report, comprising an identifier of the test case and of the test object, as well as an error code specifying how this data object failed the test.

Preferably, step 12 comprises a sub-step of acquiring user-set formatting options. The test report is then generated in a file format according to the acquired formatting options. For example, said user-set formatting options may specify that the test report must be generated as a raw text file, or in a file format for a text-editor software, such as .doc, or preferably in a structured markup language such as XML.

Thanks to the automated module, the test scripts are automatically generated according to the type of data to be tested, which makes it easier to validate a large number of data in a short time.

Figure 2:
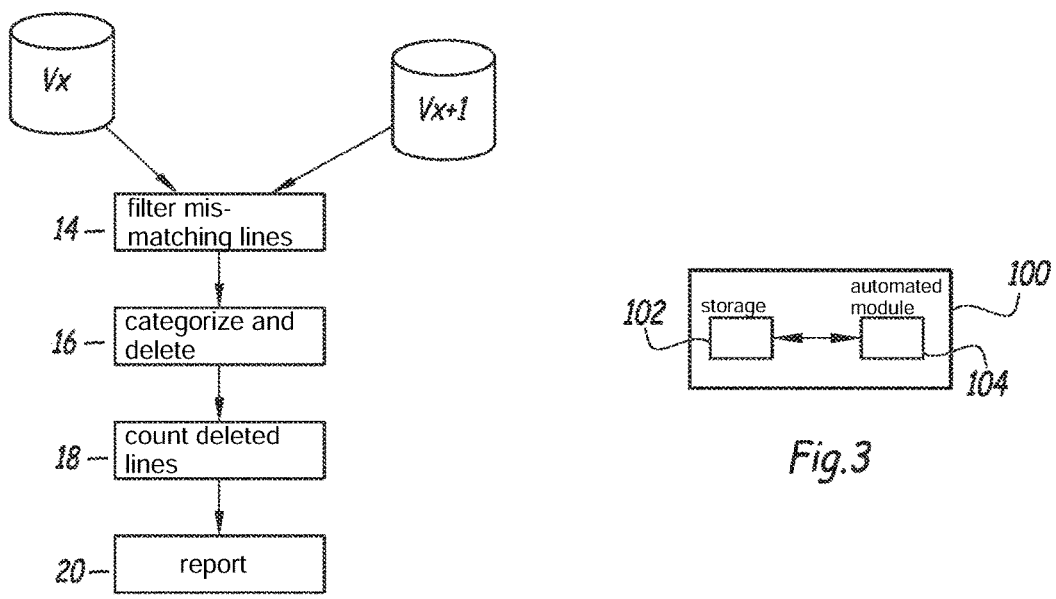
FIG. 2 is a flow-chart illustrating a step of the method of FIG. 1.

FIG. 2 illustrates a method for comparing two XML files of different versions, bearing the references Vx and Vx+1, which may differ in their structure but their data may be identical. For example, file Vx+1 may contain additional tags and/or attributes compared with Vx and which are not relevant. A line-by-line comparison of both files would therefore highlight differences between both files, even though the content stored within said attributes may be the same. In this example, this method is executed during step 2 of acquisition of the data to be tested, preferably when multiple sets of data are acquired.

This method is implemented as follows. First, files to be compared Vx and Vx+1 are loaded. Then, during a step 14, all mismatching lines between files Vx and Vx+1 are automatically filtered, for example using the XMLDiff class of the C# programming language in the .NET software framework, in order to form group of mismatching lines.

During a step 16, each group of mismatching lines is categorized based on tags, attributes and values. For each category and in each group of mismatching lines, except one line, all the other lines are removed. During a step 18, the deleted lines for each category are counted, for example by incrementing a specific counter each time a line in a specific category is removed during step 16. Finally, during a step 20, the counted values are reported and the method terminates.

Figure 3:
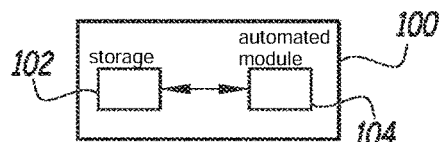
FIG. 3 is a simplified representation of an electronic calculator for implementing the method of FIG. 1.

FIG. 3 illustrates an electronic calculator 100, programmed for implementing the methods of FIGS. 1 and 2 and said automated module. Electronic calculator 100 includes data storage medium 102 and automated module 104. Storage medium 102 stores instructions for implementing said methods when said instructions are executed by automated module 104. Storage medium 102 is a computer memory, such a Flash memory unit or a magnetic hard drive.

The embodiments and alternatives described above may be combined with each other in order to generate new embodiments of the invention.

The invention claimed is:

1. A method for automatically validating data against a predefined data specification, said method comprises steps of:
    a) acquiring data to be validated, said data comprising a plurality of test objects;
    b) acquiring a test database comprising a plurality of test files each defining a test scenario;
    c) acquiring a predefined data specification against which the test objects must be validated;
    d) automatically generating a plurality of test scripts, from the acquired test files and using relevant data from the test objects of the acquired predefined data specification;
    e) for each generated test script, executing said test script on the test objects; and
    f) automatically generating a test report comprising a test result,
    wherein, during the step a) of acquiring data to be validated, the following sub-steps are carried out:
       comparing two files of different versions,
       filtering mismatching lines of the two files,
       categorizing the mismatching lines into a plurality of corresponding categories, and
       for each category, removing all mismatching lines of said category except for one mismatching line of said category.

2. The method according to claim 1, wherein the execution of said test script comprises a comparison of data comprised in the test objects with data comprised in the data specification.

3. The method according to claim 2, wherein the data compared during the execution of said test script comprises at least an attribute of the test objects.

4. The method according to claim 1, wherein said test scripts are automatically generated by a generation module by adding, to a test scenario defined by a test file, a test parameter depending on the test object.

5. The method according to claim 1, wherein the test objects are stored in an XML file.

6. The method according to claim 1, further comprising:
    acquisition of user-set formatting options, the test report being generated in a file format according to the acquired formatting options.

7. A non-transitory data recording medium, comprising instructions recorded thereon, executable on an electronic calculator, for implementing the method according to claim 1.

8. An electronic calculator for automatically validating data against a predefined data specification, said electronic calculator comprising a memory and an automated module, the memory having stored therein a program that, upon execution by the automated module, carries out the steps of:
- a) acquiring data to be validated, said data comprising a plurality of test objects;
- b) acquiring a test database comprising a plurality of test files each defining a test scenario;
- c) acquiring a predefined data specification against which the test objects must be validated;
- d) automatically generating a plurality of test scripts, from the acquired test files and using relevant data from the test objects of the acquired predefined data specification;
- e) for each generated test script, executing said test script on the test objects; and
- f) automatically generating a test report comprising a test result,
- wherein, during the step a) of acquiring data to be validated, the following sub-steps are carried out:
    - comparing two files of different versions,
    - filtering mismatching lines of the two files,
    - categorizing the mismatching lines into a plurality of corresponding categories, and
    - for each category, removing all mismatching lines of said category except for one mismatching line of said category.

* * * * *